United States Patent
Schindele

(10) Patent No.: US 9,676,056 B2
(45) Date of Patent: Jun. 13, 2017

(54) METHOD FOR JOINING TWO ESSENTIALLY METAL SHEET-TYPE WORKPIECES BY MEANS OF FRICTION SQUEEZE WELDING USING A FILLER MATERIAL

(71) Applicant: Hochschule für angewandte Wissenschaften-Fachhochschule Kempten, Kempten (DE)

(72) Inventor: Paul Schindele, Kempten (DE)

(73) Assignee: Hochschule für angewandte Wissenschaften—Fachhochschule Kempten, Kempten (DE)

(*) Notice: Subject to any disclaimer, the term of this patent is extended or adjusted under 35 U.S.C. 154(b) by 414 days.

(21) Appl. No.: 14/365,388

(22) PCT Filed: Nov. 9, 2012

(86) PCT No.: PCT/EP2012/004669
§ 371 (c)(1),
(2) Date: Jun. 13, 2014

(87) PCT Pub. No.: WO2013/087137
PCT Pub. Date: Jun. 20, 2013

(65) Prior Publication Data
US 2014/0374405 A1    Dec. 25, 2014

(30) Foreign Application Priority Data

Dec. 16, 2011 (DE) .................. 10 2011 121 199
Jan. 31, 2012 (DE) .................. 10 2012 001 778

(51) Int. Cl.
B23K 20/12 (2006.01)
B23K 5/213 (2006.01)
(Continued)

(52) U.S. Cl.
CPC ............ B23K 20/128 (2013.01); B23K 5/213 (2013.01); B23K 11/34 (2013.01);
(Continued)

(58) Field of Classification Search
CPC .. B23K 20/128; B23K 20/122; B23K 20/123; B23K 2201/18; B23K 5/20; B23K 5/213;
(Continued)

(56) References Cited

U.S. PATENT DOCUMENTS 3,619,535 A    11/1971   Sullivan
5,504,296 A     4/1996   Sato et al.
(Continued)

FOREIGN PATENT DOCUMENTS

CN    1503711    6/2004
CN    1814389    8/2006
(Continued)

OTHER PUBLICATIONS

International Search Report received in International Patent Application No. PCT/EP2012/004669, dated Feb. 6, 2013.
(Continued)

*Primary Examiner* — Christopher Kim
(74) *Attorney, Agent, or Firm* — Michael Best & Friedrich LLP

(57) ABSTRACT

The invention relates to a method for joining two essentially metal sheet-type workpieces. In said method, the edge regions of the workpieces to be joined are placed at a distance from one another, at least one wire-shaped filler material is introduced into a zone between the edge regions before or during the joining process, and edge regions and the filler material are then heated to a predefined joining temperature by at least one first frictional element that
(Continued)

moves in relation to the edge regions and the filler material, are subjected to a certain contact pressure, and are joined while being deformed.

19 Claims, 3 Drawing Sheets

(51) Int. Cl.
  *B23K 11/34* (2006.01)
  *B23K 15/00* (2006.01)
  *B23K 33/00* (2006.01)
  *B23K 20/26* (2006.01)
  *B23K 26/60* (2014.01)
  *B23K 101/18* (2006.01)
  *B23K 5/20* (2006.01)

(52) U.S. Cl.
  CPC ........ *B23K 15/0033* (2013.01); *B23K 20/122* (2013.01); *B23K 20/123* (2013.01); *B23K 20/26* (2013.01); *B23K 26/60* (2015.10); *B23K 33/002* (2013.01); *B23K 5/20* (2013.01); *B23K 2201/18* (2013.01)

(58) Field of Classification Search
  CPC .... B23K 11/34; B23K 15/0033; B23K 20/26; B23K 26/60; B23K 33/002
  USPC .. 219/121.6, 121.63, 121.64, 128, 129, 136, 219/137 R, 137.2, 137.8, 148
  See application file for complete search history.

(56) References Cited

U.S. PATENT DOCUMENTS

| 2003/0042292 | A1 | 3/2003 | Hatten et al. | |
| 2004/0134971 | A1 | 7/2004 | Narita et al. | |
| 2006/0169748 | A1 | 8/2006 | Ezumi et al. | |
| 2006/0278325 | A1 | 12/2006 | Kumagai | |
| 2010/0044347 | A1* | 2/2010 | Prochazka | B23K 9/167 219/74 |

FOREIGN PATENT DOCUMENTS

| DE | 38 02 300 C1 | 8/1989 |
| DE | 3781145 | 1/1993 |
| DE | 692 05 991 T2 | 4/1996 |
| DE | 102 38 550 A1 | 3/2004 |
| DE | 102006055994 | 5/2008 |
| DE | 102008044763 | 3/2010 |
| EP | 1 236 533 A1 | 9/2002 |
| EP | 1354660 | 10/2003 |
| GB | 572789 | 10/1945 |
| JP | 2000-158154 A | 6/2000 |
| JP | 2000301359 | 10/2000 |
| JP | 2000-317652 A | 11/2000 |
| JP | 2000317652 | 11/2000 |
| JP | 2004-174575 A | 6/2004 |
| JP | 2004174575 | 6/2004 |
| JP | 2007-319877 A | 12/2007 |
| JP | 2007319877 | 12/2007 |
| WO | 87/04957 | 8/1987 |
| WO | 99/39861 | 8/1999 |

OTHER PUBLICATIONS

International Search Report received in International Patent Application No. PCT/EP2012/004670, dated Feb. 6, 2013.

W. Thomas et al., "Friction Processes Benefit from a Gas Shield," Welding and Metal Fabrication, IPC Ltd. Haywards Heath, GB, vol. 666 No. 4, May 1, 1998 (4 pages).

International Search Report and Written Opinion of the International Searching Authority for Application No. PCT/EP2011/006226 dated Mar. 28, 2012 (English Translation 8 pages).

* cited by examiner

METHOD FOR JOINING TWO ESSENTIALLY METAL SHEET-TYPE WORKPIECES BY MEANS OF FRICTION SQUEEZE WELDING USING A FILLER MATERIAL

BACKGROUND OF THE INVENTION

For the material-bonded joining of metal sheets or similar workpieces, both fusion and pressure welding methods may be used.

In the case of fusion welding methods, a common molten pool of the two parts being connected is created, with the optional addition of a filler material, usually in the form of a welding wire. This is followed by the creation of a pool solidification structure. The thermal loading of the components in the joining region is equivalent to the melting temperatures of the materials to be joined.

In the case of pressure welding methods, apart from the heating by various heat sources, such as for example electrical resistance heating, the material is brought to the softening temperature and pressed together by a pressing force, whereby a welded connection is created.

In the case of the known friction stir welding, the materials to be connected are heated by a stirring process and intermixed in the welding region. However, this method is limited to specific materials that deform well and to minimum material thicknesses.

In the case of cold pressure welding, there is likewise a restriction to softer materials and specific material thicknesses.

The joining of thin-walled workpieces, in particular the joining of metal sheets, requires special measures, since the volume of material that is made available by the workpieces in the joining region is very small and since damage to the adjacent regions of the metal sheets must be avoided. It has therefore already been proposed in the case of friction welding methods for joining thin-walled metal tubes to other bodies to widen the periphery of the metal tube before the friction welding in order to prevent notching. This is described in DE 38 02 300 C1. Another method, in which the contact zone is made as large as possible with a frictional tool, is shown by EP 1 236 533 A1.

SUMMARY OF THE INVENTION

The present invention provides, in one aspect, a method for joining two essentially metal sheet-like workpieces. The method includes spacing at least two peripheral regions of the workpieces in relation to one another, introducing at least one filler material in the form of a wire into a region between the peripheral regions before or during a joining operation, heating the peripheral regions and the filler material to a predetermined joining temperature by means of at least a first frictional element performing a relative movement in relation to the peripheral regions and the filler material, and subjecting the first frictional element to a pressing pressure to deform and join the workpieces.

The invention is based on providing a method for joining two essentially metal sheet-like workpieces which, while having a simple structure and being easy to apply at low cost, requires little expenditure on equipment and makes it possible for the sheet-like workpieces to be reliably joined.

The invention consequently describes a method for joining two essentially metal sheet-like workpieces in which the peripheral regions to be joined of the workpieces are positioned with a spacing in relation to one another, in which at least one filler material in the form of a wire is introduced into a region between the peripheral regions before or during the joining operation and in which the peripheral regions and the filler material are subsequently heated to a predetermined joining temperature by means of at least a first frictional element, performing a relative movement in relation to the peripheral regions and the filler material, and are subjected to a pressing pressure and joined while being deformed.

In the case of the friction squeeze welding method according to the invention for joining two essentially metal sheet-like workpieces, the filler material required for the joining is consequently supplied in the form of a wire or strip. This wire may be formed as round or rectangular or of any other desired form with regard to its cross section. It is consequently possible on the one hand to bridge peripheral gaps that may arise when the workpieces are cut to size. It is also possible thereby to compensate for irregularities or the like. This has the overall effect of creating the possibility of realizing a high-quality joined connection (weld seam) by means of a sufficient volume of filler material.

In the case of the method according to the invention, the workpieces and the filler material may each consist of the same material, but it is also possible to use different materials. It is consequently also possible to join workpieces that are produced from different materials.

The joining region is not melted, but is merely plastified. This is particularly advantageous with regard to the microstructural properties. Furthermore, it is also possible by means of the method according to the invention to weld to one another materials that cannot be connected by means of the classic joining methods.

In the case of connecting metal sheets by welding, the sheets may also be placed in abutment with a small gap, a round or rectangle wire being placed into the gap as filler material. The gap is preferably chosen such that it is filled by the wire subsequently worn down by friction. The thickness of the wire is similarly adapted to the width of the gap.

With the frictional element, the filler material and the edges of the sheet are plastified by a rotating and/or oscillating frictional movement, so that they enter into a pressure-welded connection as a result of the pressing force of the frictional element.

In the case of the method according to the invention, the peripheral regions to be joined are consequently placed next to one another, and thereby positioned. The filler wire is positioned by means of a feed device or manually in such a way that it is drawn into the region of the joint between the sheets by the frictional element after the plastifying. After that, the peripheral regions and the filler material are heated to a predetermined joining temperature by means of a frictional element and at the same time subjected to a pressing pressure. The frictional element is set in a relative movement in relation to the peripheral regions and the filler material. The frictional heat has the effect that the peripheral regions and the filler material are heated and thereby plastified. The pressing pressure applied by the frictional element, which acts perpendicularly to a central plane of the workpieces and consequently presses onto the peripheral regions and the filler material in wire form, thereby leads to a plastifying of the material of the peripheral regions and the filler material, and consequently to a squeezing of the peripheral regions and the filler material. This produces a pressure-welded connection between the sheets and the filler material.

According to the invention, the frictional element is pressed onto the peripheral regions at the circumference as a frictional disk or at the end face as a frictional stud; by contrast with the prior art, it is not between the sheets as in the case of friction stir welding.

In one embodiment of the invention, it is provided that the relative movement of the frictional element in relation to the peripheral regions and the filler material takes place by a rotation and/or turning and/or oscillation of the frictional element. This relative movement produces the frictional heat required for the joining. To produce a longer weld seam, an advancing movement is performed along the peripheral regions and while supplying filler wire.

The invention is consequently suitable both for joining relatively long peripheral regions to form a relatively long joining weld and for connecting the workpieces at specific points or spatially confined locations. It is consequently also possible by the friction welding method according to the invention to produce spot-welded connections. In this case, the peripheral regions to be joined are correspondingly short, whether in the linear direction or in the form of round or part-circular regions.

In dependence on the joining parameters, in particular in dependence on the geometry and the material of the workpieces, it may be favorable in a development of the method according to the invention either to additionally heat the peripheral regions and/or the filler material by means of an external heat source or to heat them by means of an additional frictional element, which is moved ahead of the first, aforementioned frictional element during a longitudinal movement of the latter. In the case of heating by means of an external heat source, resistance heating, inductive heating, heating by a flame (gas flame), a hot gas, laser, arc, electron beam, plasma jet or by smouldering contacts, in a way similar to flash butt welding, may be used.

The use of additional heat sources is favorable especially whenever the filler material and the workpieces have very different softening temperatures, thermal conductivities or thermal capacities. The additional heating then allows the amount of heat that is necessary for plastifying each material, and consequently for successful welding, to be supplied to each material. Thus, a thick copper workpiece has a high heat dissipation and requires additional heat, while a thin copper wire to be welded is brought to the softening temperature very quickly. When welding a tungsten wire onto a copper workpiece, it is advantageous for example to perform a pre-heating to the softening temperature of the high-melting tungsten wire with an arc, plasma jet, laser beam or electron beam. When doing so, it is advisable to use a shielding gas during the pre-heating, in order to avoid oxidation.

Preceding frictional elements in the form of rotating disks or rollers may be used both for the pre-heating of the workpieces and/or of the filler material and for the removal of oxide films.

In order to produce a smooth, not raised joining weld that is of essentially the same thickness as the workpieces, it may be favorable to smooth the joined peripheral regions in the heated state by means of a smoothing element. The smoothing element may likewise perform a relative movement in relation to the peripheral regions, in a way similar to a roller or a rotating pin moving along the longitudinal seam.

In one embodiment of the invention, an element either in the form of a rod or a roller or a roll is used as the first frictional element and/or as the additional frictional element and/or as the smoothing element. If an element in the form of a rod is used, the turning axis of which is arranged perpendicularly to the central plane of the workpieces, it is favorable if the end face of the element in rod form is beveled or provided with a radius.

According to the invention, the relative movement may also be produced by an oscillating movement of the first frictional element.

For joining very thin-walled sheet-like workpieces or for joining peripheral regions that are inexact or imprecise in their geometry, it is consequently favorable if at least one filler material, for example in the form of a wire, is introduced between the peripheral regions before or during the joining operation.

In order to work thick workpieces, it may be favorable to provide in addition to the first frictional element a second frictional element on the rear side of the workpiece, performing not only a supporting function but also additionally a frictional function.

According to the invention, it has been found in particular to be especially favorable if the frictional element is formed as a roller or wheel, since this allows an intensified relative movement to be imparted for plastifying the region of the weld.

By applying multiple filler materials, for example in the form of wires or strips in squeeze connections lying one on top of the other, multi-layer weldings can be executed.

The frictional element in rod form is preferably beveled or provided with a radius at its end face, whereby the material to be beaded can be engaged more easily.

The frictional element in disk form is preferably moved in a co-rotating manner in the advancing direction, but may also counter-rotate.

The heating can be influenced by way of the relative speed of the frictional element with respect to the workpieces and the filler material.

For an increase in the welding rate and for welding thicker materials, it may be advantageous if the material ahead of the welding location is additionally preheated by further external heat sources. The following heat sources come into consideration for this: an additionally used preceding frictional element and/or resistance heating, inductive heating, a gas flame, hot gas, laser, arc, electron beam, plasma jet, smouldering contacts as in the case of flash butt welding, etc.

It may be advantageous if the weld is subsequently smoothed by a second frictional element or a rolling operation, preferably in the still warm state. This is performed by using a second frictional element in rod form rotating in the opposite direction to the first frictional element.

In the case of a second frictional element in disk form, the smoothing operation may be performed both in co-rotation and in counter-rotation in relation to the advancing direction.

Among the advantages of the method according to the invention are:

Less thermal influencing than in the case of fusion welding methods.

A square butt joint with little force flux is created.

Little expenditure on equipment.

High welding rates can be achieved with a high rotational speed or relative speed between the frictional element and the workpiece and optional additional introduction of heat.

The weld can be made with a smooth surface, as a result of which there is no notching of the weld; no lap weld has to be produced as in the case of other methods, and so material is saved.

Can be used for very many materials, even those that are difficult to weld, such as Al or Cu.

Fine-grained weld structure created by beading operation.

No shielding gas required.

Oxide films that are present are reliably removed by the friction process.

No protection from arc or laser radiation necessary.

Out-of-position welding possible without any problem, since there is no liquid molten pool.

Smooth surfaces can be produced.

BRIEF DESCRIPTION OF THE DRAWINGS

The invention is described below on the basis of exemplary embodiments in conjunction with the drawing, in which.

DETAILED DESCRIPTION

Figure 1:
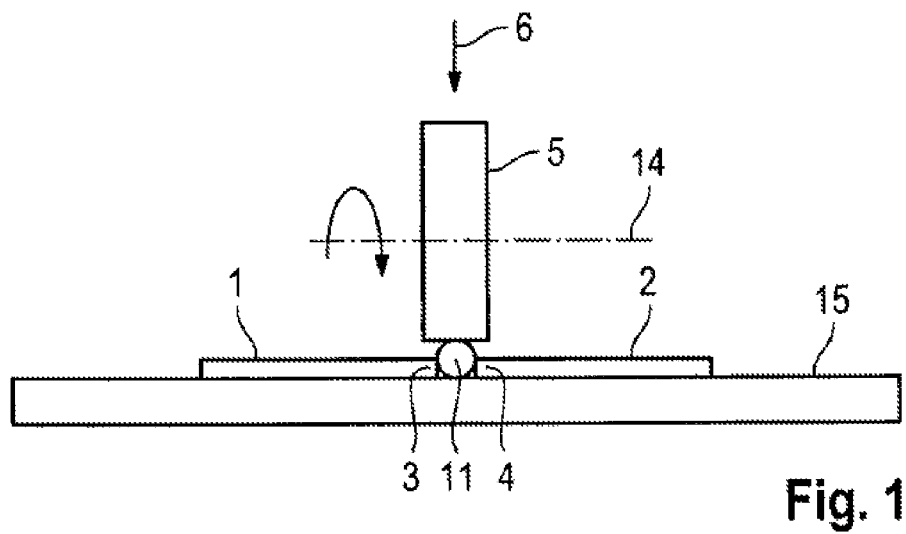
FIG. 1 shows a simplified schematic side view of a first exemplary embodiment of the method according to the invention.

FIG. 1 shows a tool table 15, on which two workpieces 1, 2 in sheet form are arranged. These have a spacing from one another, into which a filler material 11 in the form of a wire is placed adjacent to the peripheral regions 3, 4 of the workpieces 1, 2. The filler material (wire) 11 is heated by means of a first frictional element 5 in the form of a disk and is pressed into place by means of a pressing force 6. The frictional element 5 rotates about the turning axis 14.

After the heating and plastifying of the filler material 11, the peripheral regions 3 and 4 are also heated and plastified, and so this is followed by a joining weld being formed by pressing of the plastified materials.

The frictional disk 5 may be produced for example from V2A material. It runs without lubrication, and consequently in a dry state, at revolutions of for example 12,000 to 18,000 rpm. The frictional element 5 does not produce any abrasion, and so there is no loss of material. Rather, the frictional element 5 serves merely for heating and plastifying and for applying the pressing force 6.

Figure 2:
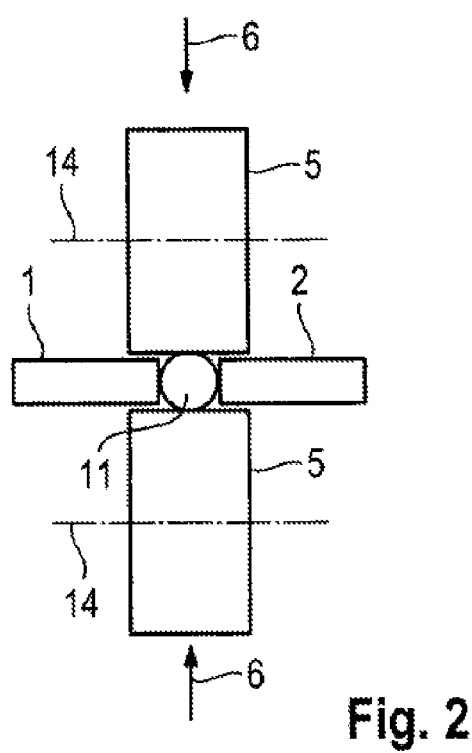
FIG. 2 shows a modified configurational form of the method according to FIG. 1.
Figure 3:
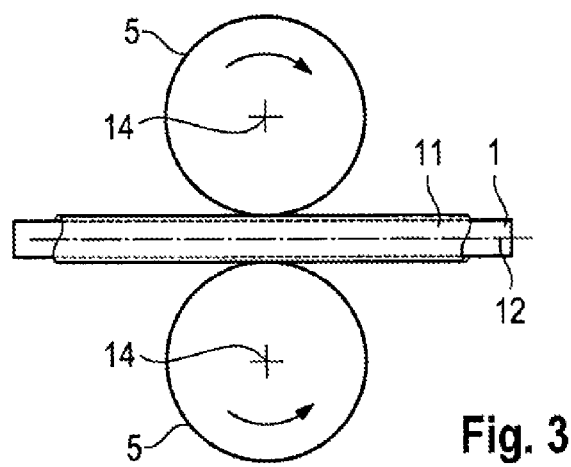
FIG. 3 shows a side view of the arrangement from FIG. 2.

FIGS. 2 and 3 show a modified exemplary embodiment, which differs from the exemplary embodiment of FIG. 1 in that, instead of the table 15, a second frictional element 5, which likewise turns about a turning axis 14, and is consequently designed for heating or plastifying and for applying a pressing force 6, is arranged on the underside of the workpieces 1, 2. Consequently, in the case of the exemplary embodiment of FIGS. 2 and 3, heating and plastifying and pressing take place on both sides.

Figure 4:
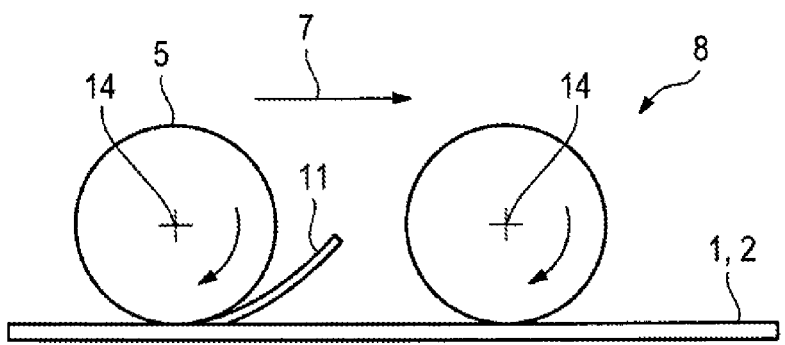
FIG. 4 shows a side view of a modified exemplary embodiment with a preceding frictional disk.

In the case of the exemplary embodiment shown in FIG. 4, a preceding frictional disk (frictional element) 8 is provided. This likewise rotates about its turning axis 14, and consequently forms an additional heat source in order to heat the workpieces 1, 2. After that, the filler material 11 in the form of a wire is introduced and, as described in conjunction with FIG. 1, is heated by means of the frictional element 5 and is squeezed by applying the pressing force (not represented), and so a joining weld is obtained. The advancing direction is represented in FIG. 4 by the arrow 7.

Figure 5:
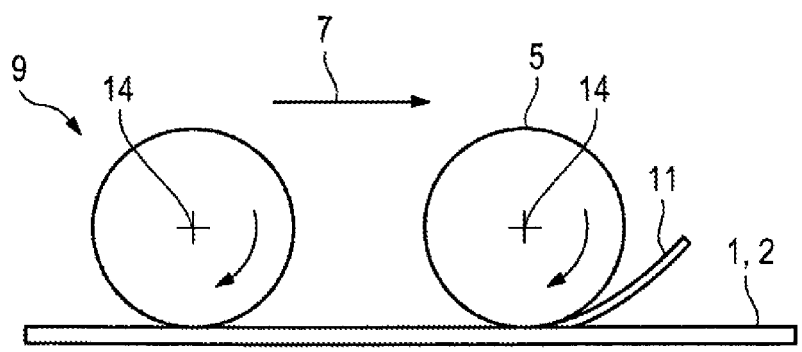
FIG. 5 shows a view, analogous to FIG. 4, of a modified exemplary embodiment with a following smoothing disk.

FIG. 5 shows a configurational variant, in which a following disk 9, which rotates about a turning axis 14, is provided as a smoothing element 9, in order to form a smooth surface of the weld seam.

Figure 6:
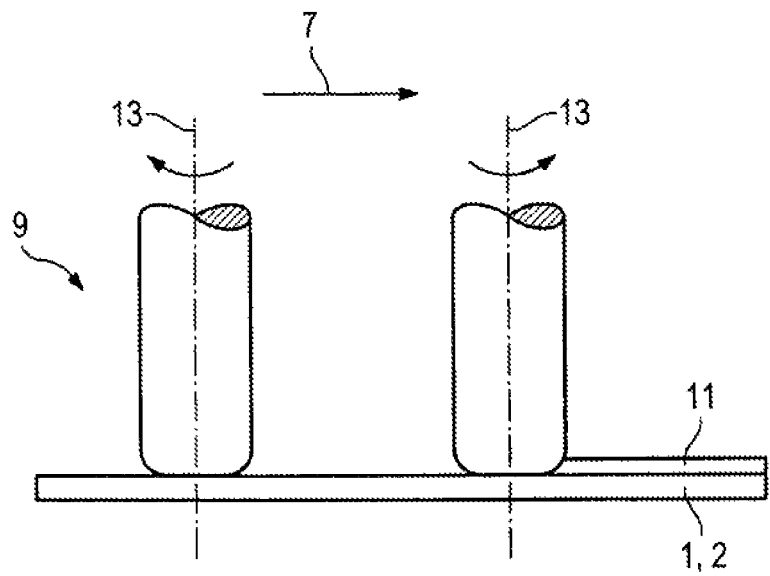
FIG. 6 shows a further exemplary embodiment, analogous to FIG. 5, using frictional and smoothing elements in rod form.

In the case of the exemplary embodiment shown in FIG. 6, it is envisaged as a modification of the exemplary embodiment of FIG. 5 to use frictional and smoothing elements 9 in rod form that can be set in rotation about their axes of rotation 13. On the end faces, the frictional and smoothing elements are beveled and/or provided with rounded edges.

It goes without saying that the variants described in FIGS. 4 to 6 can be combined with an additional heat source 8 or smoothing element 9.

Figure 7:
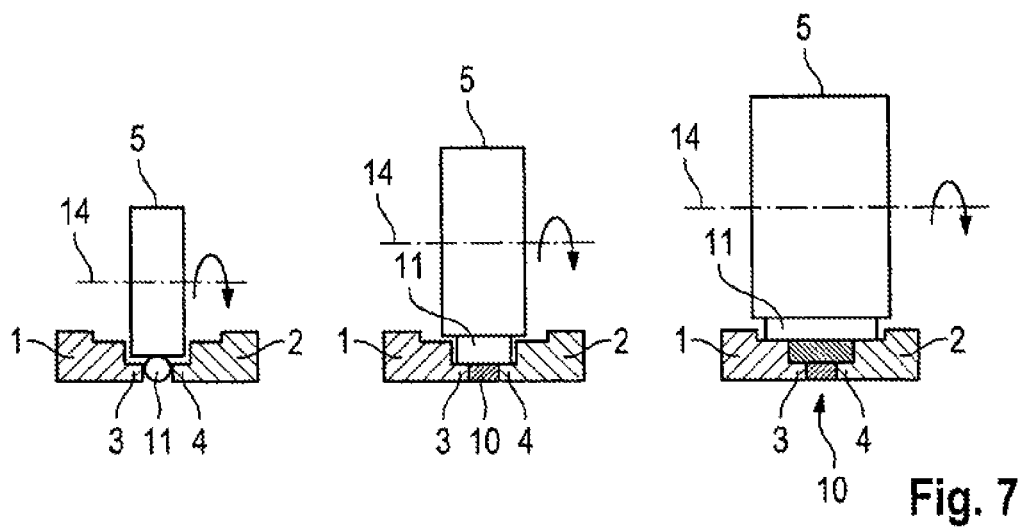
FIG. 7 shows three views of the forming of a multi-layer weld.

FIG. 7 shows a further exemplary embodiment, in which a multi-layer weld is formed. For this purpose, the peripheral regions 3, 4 of the workpieces 1, 2 are of a stepped form. In the representation on the left in FIG. 7, pressing-in of a round filler material 11 in the form of a wire first takes place, in a way analogous to the representation in FIG. 1. The representation in the middle of FIG. 7 shows the joining weld 10 formed in the first step (representation on the left in FIG. 7), onto which a further element in the form of a wire is placed as filler material 11. This has in this case a cuboidal cross section and is likewise heated and plastified by a frictional element 5 and pressed or squeezed by means of the pressing force (not represented). It goes without saying that the dimensioning of the filler material 11 and also the width of the frictional element 5 must be adapted appropriately.

In the case of the representation on the right in FIG. 7, two joining welds 10 have been formed. A further rectangular filler material 11 in the form of a wire is placed on and is heated and plastified and squeezed by means of a frictional element 5. It is possible in this way to form multi-layer joining welds.

Various features of the invention are set forth in the following claims.

The invention claimed is:

1. A method for joining two workpieces, the method comprising:
   spacing at least two peripheral regions of the workpieces in relation to one another;
   introducing at least one filler material in the form of a wire into a region between the peripheral regions before or during a joining operation;
   heating the peripheral regions and the filler material to a predetermined joining temperature by means of at least a first frictional element performing a relative movement in relation to the peripheral regions and the filler material; and
   subjecting the first frictional element to a pressing pressure to deform the filler material and join the workpieces.

2. The method as claimed in claim 1, wherein the relative movement of the first frictional element is applied by one of rotational, turning, oscillation, and and/or longitudinal movement along the peripheral regions.

3. The method as claimed in claim 1, wherein, for the heating of the peripheral regions to the joining temperature, an additional frictional element is applied to the peripheral regions and moved in relation to the peripheral regions ahead of the first frictional element.

4. The method as claimed in claim 3, wherein an element in the form of a rod, with an end face that is beveled or provided with a radius and placed against the peripheral regions is used as the additional frictional element.

5. The method as claimed in claim 3, wherein an element in the form of a roller or roll placed against the peripheral regions is used as the additional frictional element.

6. The method as claimed in claim 1, wherein, for the heating of the peripheral regions to the joining temperature, the peripheral regions are additionally heated by means of an external heat source selected from a group consisting of resistance heating, inductive heating, a gas flame, hot gas, laser, arc, electron beam, plasma jet, and smouldering contact.

7. The method as claimed in claim 6, wherein the joined peripheral regions are smoothed in the heated state by means of a smoothing element, which performs a relative movement in relation to the peripheral regions.

8. The method as claimed in claim 7, wherein the first frictional element is moved in a rotating or oscillating relative movement in relation to the peripheral regions and in a longitudinal movement along the peripheral regions.

9. The method as claimed in claim 8, wherein the peripheral regions are formed as straight.

10. The method as claimed in claim 9, wherein the first frictional element is supported on a rear side of the workpieces by a second frictional element.

11. The method as claimed in claim 1, wherein the joined peripheral regions are smoothed in the heated state by means of a smoothing element, which performs a relative movement in relation to the peripheral regions.

12. The method as claimed in claim 11, wherein an element in the form of a rod, with an end face that is beveled or provided with a radius and placed against the peripheral regions is used as the smoothing element.

13. The method as claimed in claim 11, wherein an element in the form of a roller or roll placed against the peripheral regions is used as the smoothing element.

14. The method as claimed in claim 1, wherein an element in the form of a rod, with an end face that is beveled or provided with a radius and placed against the peripheral regions is used as the first frictional element.

15. The method as claimed in claim 1, wherein the first frictional element is moved in a rotating or oscillating relative movement in relation to the peripheral regions and in a longitudinal movement along the peripheral regions.

16. The method as claimed in claim 1, wherein the peripheral regions are formed as straight.

17. The method as claimed in claim 1, wherein the first frictional element is supported on a rear side of the workpieces by a second frictional element.

18. The method as claimed in claim 1, wherein the regions to be joined of the workpieces and of the filler material are heated to a plastifying temperature.

19. The method as claimed in claim 1, wherein an element in the form of a roller or roll placed against the peripheral regions is used as the first frictional element.

* * * * *